(12) United States Patent
Satran et al.

(10) Patent No.: US 6,722,824 B2
(45) Date of Patent: Apr. 20, 2004

(54) CUTTING INSERT

(75) Inventors: Amir Satran, Kfar Vradim (IL); Daniel Ulianitsky, Maalot-Tarshiha (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/041,480

(22) Filed: Jan. 10, 2002

(65) Prior Publication Data

US 2002/0098049 A1 Jul. 25, 2002

(30) Foreign Application Priority Data

Jan. 25, 2001 (IL) .................................................. 141089

(51) Int. Cl.⁷ .............................. B23B 27/00; B23C 5/20
(52) U.S. Cl. ........................................ 407/113; 407/114
(58) Field of Search ................. 407/113, 114, 407/115, 116

(56) References Cited

U.S. PATENT DOCUMENTS

| | | | | |
|---|---|---|---|---|
| 4,297,058 A | * | 10/1981 | Armbrust et al. | 407/113 |
| 4,930,945 A | * | 6/1990 | Arai et al. | 407/113 |
| 5,052,863 A | * | 10/1991 | Satran | 407/113 |
| 5,365,805 A | * | 11/1994 | Pantzar et al. | 407/114 |
| 5,421,679 A | * | 6/1995 | Pantzar et al. | 407/114 |
| 5,441,370 A | * | 8/1995 | Pantzar et al. | 407/113 |
| 5,597,271 A | * | 1/1997 | Men et al. | 407/113 |
| 5,685,670 A | * | 11/1997 | Satran | 407/113 |
| 5,718,540 A | * | 2/1998 | Satran et al. | 407/113 |
| 5,951,212 A | | 9/1999 | Emoto et al. | 407/34 |
| 5,971,672 A | * | 10/1999 | Hansson | 407/114 |
| 6,146,063 A | * | 11/2000 | Ramold et al. | 407/113 |

* cited by examiner

*Primary Examiner*—Erica Cadugan
*Assistant Examiner*—Dana Ross
(74) *Attorney, Agent, or Firm*—Womble Carlyle

(57) ABSTRACT

A generally square-shaped indexable cutting insert with four cutting edges for mounting in milling cutters for either slotting operations or for left-hand and right-hand face milling of right-angled corners in a metal workpiece. The cutting edge is parallel to the bottom surface and has a primary cutting edge extending between two wipers, each wiper being adjacent a corner edge. A first relief surface adjacent the primary cutting edge has a first relief angle and a second relief adjacent the two wipers has a second relief angle that is greater than the first relief angle. The first relief surface has a width dimension measured perpendicularly to the cutting edge that has a minimum value proximal to the two wipers and a maximum value at a central region of the cutting edge.

22 Claims, 3 Drawing Sheets

CUTTING INSERT

FIELD OF THE INVENTION

This invention relates to a generally square-shaped indexable cutting insert with four cutting edges for mounting in milling cutters for either slotting operations or for left-hand and right-hand face milling of right-angled corners in a metal workpiece.

BACKGROUND OF THE INVENTION

In prior art milling cutters having square shaped indexable cutting inserts for milling of right-angled corners in a metal workpiece, the cutting inserts are generally mounted in such a way that a reference plane formed by the four cutting edges generates a negative radial rake and a positive axial rake (helix). Each insert has a main cutting edge for milling in a workpiece a right-angled corner, or shoulder, and a transversely directed secondary cutting edge. The secondary cutting edge generally comprises two sections, a section adjacent the main cutting edge that serves as a wiper for forming a smooth base wall of the shoulder and a non-operative section. The cutting insert is designed and mounted in the milling cutter so that a small clearance is formed between the non-operative section and the base wall of the shoulder.

Since the cutting insert is mounted with a positive axial rake it preferably has a positive geometry in order to ensure a clearance between the base wall of the shoulder and the side flank of the insert adjacent the base wall of the shoulder. A cutting insert mounted as described above in a milling cutter would have a relatively small cutting edge wedge angle and a large radial relief angle. Consequently, during machining the cutting insert would be susceptible to breakage in the region of the cutting edge and the milling cutter can also suffer from chatter. It has been found that the cutting insert's performance can be improved when the clearance between the workpiece and the inserts side flank adjacent the workpiece is reduced in the region of the main cutting edge but is not reduced in the region of the wiper.

Of particular interest are generally square shaped cutting inserts with four cutting edges that can be used for both left-hand and right-hand milling. Such a cutting insert is disclosed in U.S. Pat. No. 5,951,212. However this insert does not provide for improved performance in the manner described.

It is an object of the present invention to provide a novel generally square shaped cutting insert with four cutting edges that can be used for both left-hand and right-hand milling and that provides improved performance in the manner described.

SUMMARY OF THE INVENTION

In accordance with the present invention there is provided an indexable cutting insert for use in milling cutters comprising:

- a top surface, a bottom surface and M substantially identical side surfaces extending between the bottom surface and the top surface, the top surface having the general shape of an M-sided polygon in a top view of the cutting insert;
- each side surface being located between two corner side surfaces;
- each side surface sloping outwardly from the bottom surface toward the top surface and intersecting with the top surface at a cutting edge, the cutting edge being located between two corner edges and being substantially parallel to the bottom surface;
- each cutting edge comprising a primary cutting edge extending between two wipers, each wiper being adjacent a corner edge;
- each side surface comprising at least two component surfaces, a first relief surface adjacent the primary cutting edge and a second relief surface merging with the first relief surface at a boundary line and intersecting with the top surface at the two wipers; wherein
- M is an integral multiple of four and the first relief surface has a width dimension measured perpendicularly to the cutting edge, the width dimension having a minimum value proximal to the two wipers and a maximum value at a central region of the cutting edge.

In accordance with the present invention, the first relief surface forms a first non-zero relief angle with a line perpendicular to a reference plane containing the cutting edge associated with each side surface, and the second relief surface forms, in the region of the first and second wipers, a second non-zero relief angle, wherein the second relief angle is greater than the first relief angle.

In accordance with a specific embodiment of the present invention, the boundary line of each side surface comprises two equal substantially straight boundary line sections meeting at a central region of the side surface Further in accordance with a specific embodiment of the present invention, the second relief surface comprises two similar constituent relief surfaces merging at the central region of the side surface.

Preferably, each one of the two constituent relief surfaces slopes outwardly from the corner side surfaces towards the central region of the side surface.

If desired, the first relief surface is ground.

Further if desired, the two constituent relief surfaces are ground.

Still yet further if desired, the second relief surface is provided with a recess centrally located therein.

In accordance with the present invention the cutting insert has a through bore passing through the top and bottom surfaces.

Preferably, the cutting insert comprises a pressed and sintered powder body.

In accordance with a preferred embodiment of the present invention, M is equal to four. In accordance with an embodiment of the present invention, the second relief surface is provided with a recess centrally located therein.

BRIEF DESCRIPTION OF THE DRAWINGS

For a better understanding the invention will now be described, by way of example only, with reference to the accompanying drawings in which.

DETAILED DESCRIPTION OF PREFERRED EMBODIMENTS

Figure 1:
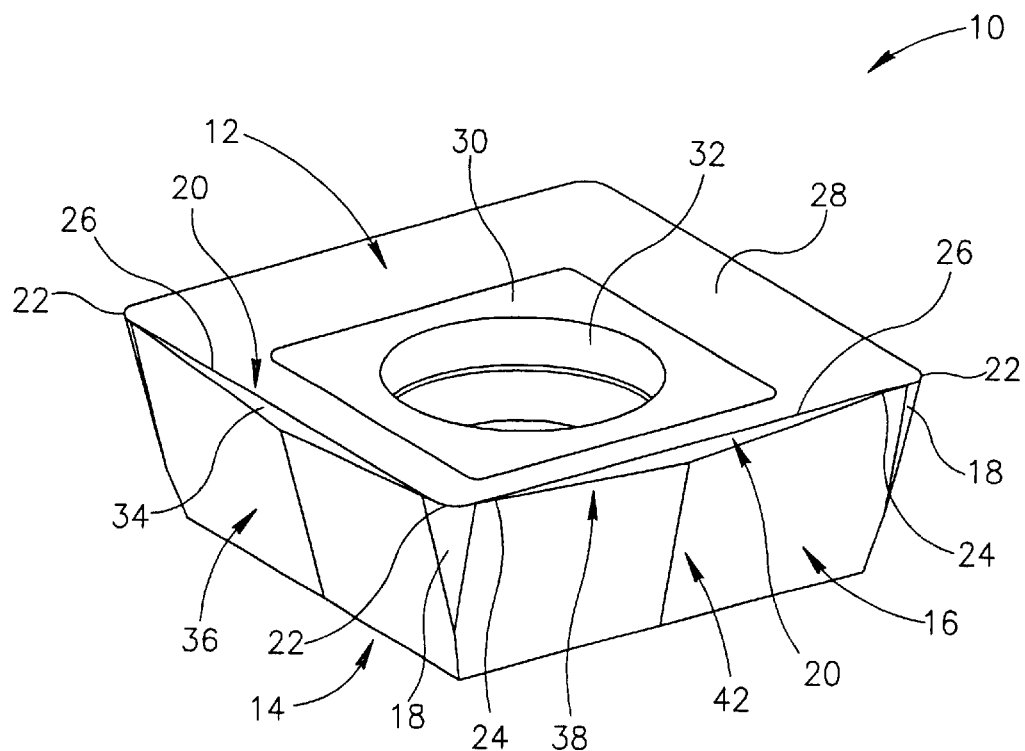
FIG. 1 is a perspective view of the cutting insert in accordance with the present invention.
Figure 2:
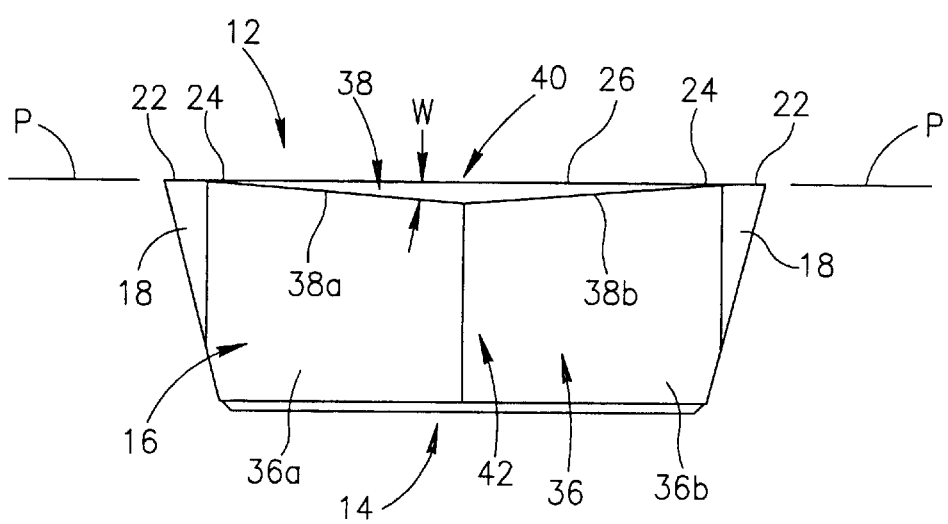
FIG. 2 is a side view of the cutting insert illustrated in FIG. 1.
Figure 3:
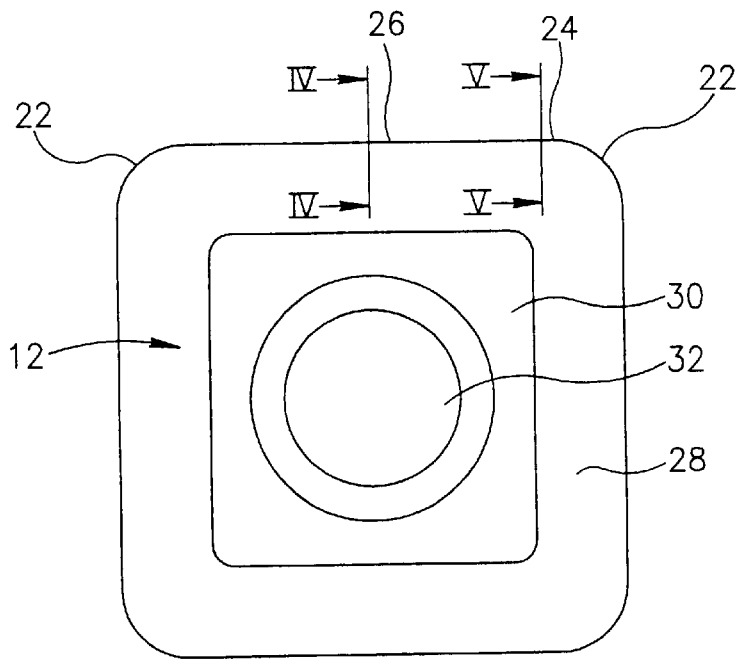
FIG. 3 is a top view of the cutting insert illustrated in FIG. 1.

Attention is first drawn to FIGS. 1 to 5. The cutting insert 10 in accordance with the present invention has a top surface 12, a bottom surface 14 and four substantially identical side surfaces 16 extending between the bottom surface 14 and the top surface 12. The cutting insert is preferably manufactured by pressing and sintering a powder body. As seen in FIG. 3 the top surface 12 is generally square-shaped in a top view of the cutting insert 10. Each side surface 16 extends between two corner side surfaces 18. The corner side surfaces 18 are radiused, having a maximum radius proximal to the top surface 12 and decreasing to a minimum radius proximal to the bottom surface. Each side surface 18 slopes outwardly from the bottom surface 14 toward the top surface 12 and intersects the top surface at a cutting edge 20. In other words, and as can be seen in FIGS. 1 and 2, the cutting insert 10 has a positive geometry, so that each side surface 16 forms an acute wedge angle $\beta$ (as will be explained in greater detail below, in accordance with the present invention $\beta$ takes on two values $\beta_1$ and $\beta_2$) with the top surface 12 of the cutting insert 10. Each cutting edge 20 is substantially parallel to the bottom surface 14 and extends between two radiused corner edges 22. The cutting edge 20 comprises two portions, two wipers 24, or auxiliary cutting edges, adjacent the corner edges 22 and a primary cutting edge 26 extending between the two wipers 24. The top surface 12 comprises a chip rake surface 28 that slopes downwardly and inwardly from the cutting edges 20, the wipers 24 and the corner edges 22 toward a central region 30 of the top surface 12. The primary cutting edges 26, the wipers 24 and the corner edges 22 are all capable of cutting and therefore the entire circumference of the top surface 12 forms a continuous cutting edge from which the chip rake surface 28 slopes downwardly and inwardly. The cutting insert 10 has a through bore 32 passing through central region 30 of the top surface 12 and through the bottom surface 14 for receiving a clamping screw for clamping the cutting insert 10 in an insert pocket of a cutting tool.

In order to strengthen the cutting insert 10 in the region of the primary cutting edges 26, each side surface 16 is divided into two component surfaces, a first relief surface 34 adjacent the primary cutting edge 26 and a second relief surface 36 merging with the first relief surface at a boundary line 38 and intersecting with the top surface 12 at the two wipers 24 on either side of the primary cutting edge 26.

The first relief surface 34 has a width dimension W measured perpendicularly to the cutting edge 20 that, in accordance with a first aspect of the present invention, has a minimum value proximal to the two corner edges 22 and a maximum value at a central region 40 of the cutting edge 20. With this construction, as can be seen in the figures, the first relief surface 34 is generally triangular in shape. Furthermore, this construction imparts to the cutting insert 10 a symmetry that enables it to be used as either a right handed or left handed cutting insert.

Figures 4, 5:
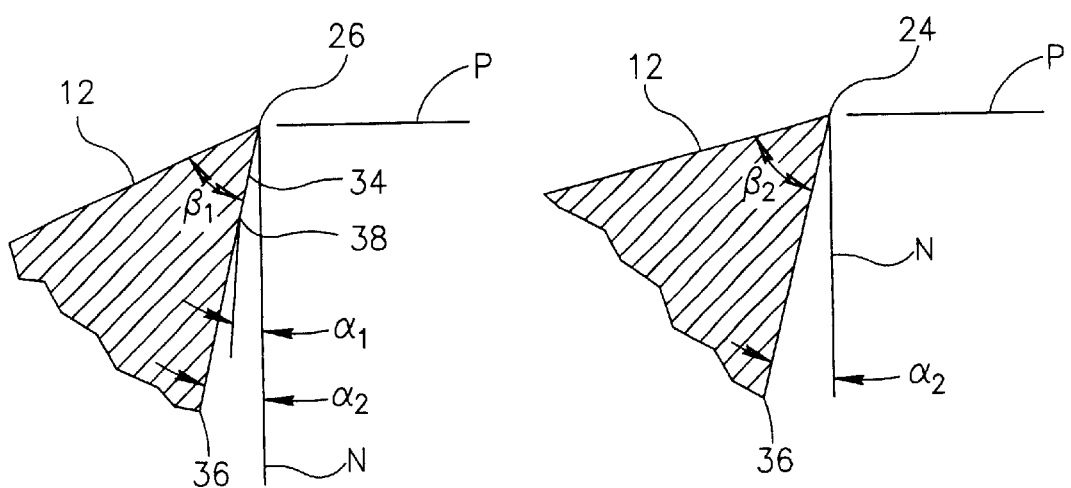
FIG. 4 is a cross section view of a portion of the cutting insert along the line IV—IV in FIG. 3.
FIG. 5 is a cross section view of a portion of the cutting insert along the line V—V in FIG. 3.

A second aspect of the present invention concerns the relief, or clearance, of the side surfaces 16 of the cutting insert 10. In the description and claims, a reference plane P containing the cutting edge 20 associated with each side surface 16 is defined. Since each cutting edge 20 is substantially parallel to the bottom surface 14, the reference plane P is also parallel to the bottom surface 14 of the cutting insert 10 as can be seen in FIG. 2. In accordance with a second aspect of the present invention, the first relief surface 34 forms a first relief angle $\alpha_1$ with a line N perpendicular to the reference plane P, and the second relief surface 36 forms, in the region of the wipers 24, a second relief angle $\alpha_2$, wherein the second relief angle $\alpha_2$ is greater than the first relief angle $\alpha_1$. As can be seen in FIGS. 4 and 5, in accordance with this aspect of the invention, the wedge angle $\beta_1$ in the region of the primary cutting edge 26 of each side surface 16 is greater than the wedge angle $\beta_2$ in the region of the wipers 24. Clearly, the presence of the first relief surface 34 strengthens the cutting insert 10 in the region of the primary cutting edge 26 due to the increased wedge angle. In accordance with a specific non-binding example, $\alpha_2=14°$ and $\alpha_1=8°$ thereby increasing the clearance at the primary cutting edge by 6° whilst strengthening the cutting insert by increasing the wedge angle along the primary cutting edge 26.

As can be seen in the figures, the boundary line 38 of each side surface 16 comprises two equal boundary line sections 38a, 38b meeting at a central region 42 of the side surface 16. In accordance with a preferred embodiment of the present invention, the boundary line sections 38a, 38b are straight lines. In a similar manner, the second relief surface 36 comprises two similar constituent relief surfaces 36a, 36b merging at the central region 42 of the side surface 16. For each side surface 16, each one of the two constituent relief surfaces 36a, 36b slopes outwardly from adjacent corner side surfaces 18 towards the central region 42 of the side surface where they merge.

Although for many purposes it will suffice to manufacture the cutting insert illustrated in FIGS. 1 to 5 by pressing and sintering without any further processing, greater accuracy can be obtained by grinding some of the surfaces. Therefore, if desired, the first relief surface 34 is a ground surface. Further if desired, the two constituent relief surfaces 36a, 36b are ground surfaces.

Figure 6:
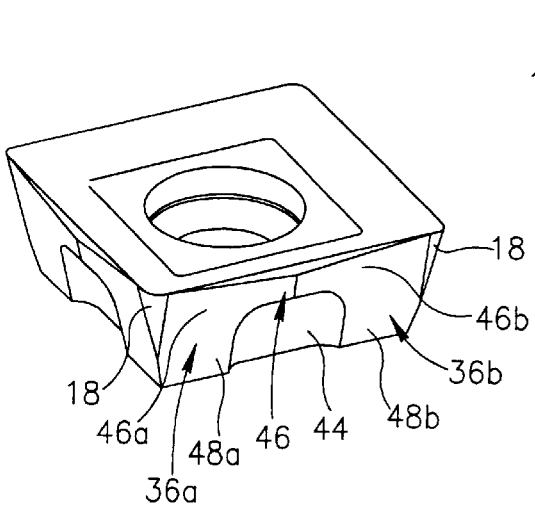
FIG. 6 is a perspective view of the cutting insert in accordance with the present invention with a recess in each second relief surface.

Attention is now drawn to FIG. 6, illustrating the cutting insert 10 in accordance with the teachings of the present invention, in which each second relief surface 36 is provided with a recess 44 centrally located therein. Each constituent relief surface 36a, 36b is divided into two regions, an upper region 46a, 46b and a lower region 48a, 48b. The lower regions 48a, 48b of the two constituent relief surfaces 36a, 36b of a given side surface 16 slope outwardly from adjacent corner side surfaces 18 towards the recess 44. On the other hand, the upper regions 46a, 46b of the two constituent relief surfaces 36a, 36b merge at an upper central region 50 of the side surface 16 above the recess 44.

Figure 7:
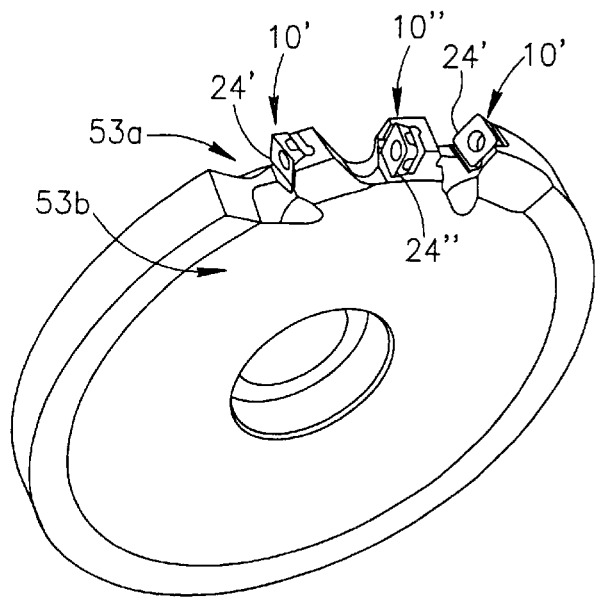
FIG. 7 is slotting cutter in which are seated cutting inserts in accordance with the present invention.
Figure 8:
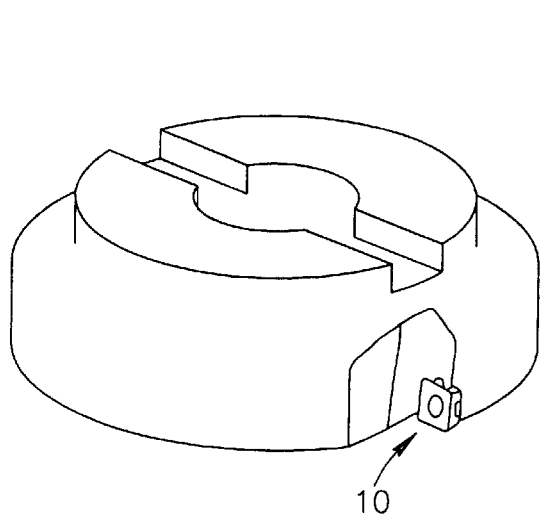
FIG. 8 is face-milling cutter in which are seated cutting inserts in accordance with the present invention.

FIGS. 7 and 8, illustrate preferred applications of the cutting insert 10 of the present invention. FIG. 7 shows a slotting cutter 52, in which only three identical radially mounted cutting inserts 10 (10', 10") are shown. The cutting inserts 10 are mounted as both left-hand inserts 10' and right-hand inserts 10". The cutting inserts mounted as left-hand inserts 10' have an operative wiper 24' proximate to one face 53a of the slotting cuter 52, whereas the cutting inserts mounted as right-hand inserts 10" have an operative wiper 24" proximate to the other face 53b of the slotting cuter 52. FIG. 8 shows a face-milling cutter 54 for right-handed milling of a work piece, using cutting inserts 10 in accordance with the present invention (only one insert is shown). In a similar manner, cutting inserts 10 in accordance with the present invention can be used in a face-milling cutter for left-handed milling of a work piece.

Although the present invention has been described to a certain degree of particularity, it should be understood that various modifications and alterations can be made without departing from the spirit or scope of the invention as hereinafter claimed. For example, the invention has been described with respect to a cutting insert that is generally square-shaped in a top view of the cutting insert. However, the invention is by no means restricted to a cutting insert with a generally square-shaped geometry. It will be appreciated that the invention applies equally well to a cutting insert that is generally octagonally-shaped in a top view of the cutting insert. In general, the invention applies equally well to a cutting insert that is generally M-shaped in a top view of the cutting insert, where M is an integral multiple of four.

What is claimed is:

1. An indexable cutting insert for use in milling cutters comprising:
    a top surface, a bottom surface and M substantially identical side surfaces extending between the bottom surface and the top surface, the top surface having the general shape of an M-sided polygon in a top view of the cutting insert;
    each side surface being located between two corner side surfaces;
    each side surface sloping outwardly from the bottom surface toward the top surface and intersecting with the top surface at an insert cutting edge, the insert cutting edge being located between two corner edges and being substantially parallel to the bottom surface;
    each insert cutting edge comprising a primary cutting edge extending between two auxiliary cutting edges, each auxiliary cutting edge being adjacent a corner edge;
    each side surface comprising at least two component surfaces: a first relief surface adjacent the primary cutting edge, and a second relief surface merging with the first relief surface at a boundary line and intersecting with the top surface at the two auxiliary cutting edges; wherein
    M is an integral multiple of four and the first relief surface has a width dimension measured perpendicularly to the insert cutting edge, the width dimension having a minimum value proximal to the two auxiliary cutting edges and a maximum value at a central region of the insert cutting edge.

2. The cutting insert according to claim 1, wherein the first relief surface forms a first non-zero relief angle with a line perpendicular to a reference plane containing the insert cutting edge associated with each side surface, and the second relief surface forms, in the region of the first and second auxiliary cutting edges, a second non-zero relief angle, wherein the second relief angle is greater than the first angle.

3. The cutting insert according to claim 2, wherein the boundary line of each side surface comprises two substantially equal straight boundary line sections meeting at a central region of the side surface.

4. The cutting insert according to claim 3, wherein the second relief surface comprises two similar constituent relief surfaces merging at the central region of the side surface.

5. The cutting insert according to claim 4, wherein each one of the two constituent relief surfaces slopes outwardly from the corner side surfaces towards the central region of the side surface.

6. The cutting insert according to claim 3, wherein the first relief surface is ground.

7. The cutting insert according to claim 4, wherein the two constituent relief surfaces are ground.

8. The cutting insert according to claim 2, wherein the cutting insert has a through bore passing through the top and bottom surfaces.

9. The cutting insert according to claim 2, wherein the cutting insert comprises a pressed and sintered powder body.

10. The cutting insert according to claim 2, wherein M is equal to four.

11. The cutting insert according to claim 1, wherein the second relief surface is provided with a recess centrally located therein.

12. The cutting insert according to claim 2, wherein the second relief surface is provided with a recess centrally located therein.

13. The cutting insert according to claim 3, wherein the second relief surface is provided with a recess centrally located therein.

14. The cutting insert according to claim 4, wherein the second relief surface is provided with a recess centrally located therein.

15. The cutting insert according to claim 5, wherein the second relief surface is provided with a recess centrally located therein.

16. The cutting insert according to claim 6, wherein the second relief surface is provided with a recess centrally located therein.

17. The cutting insert according to claim 7, wherein the second relief surface is provided with a recess centrally located therein.

18. The cutting insert according to claim 8, wherein the second relief surface is provided with a recess centrally located therein.

19. The cutting insert according to claim 9, wherein the second relief surface is provided with a recess centrally located therein.

20. The cutting insert according to claim 10, wherein the second relief surface is provided with a recess centrally located therein.

21. The cutting insert according to claim 1, wherein the primary cutting edge, the auxiliary cutting edges and the corner edges are all capable of cutting such that the entire circumference of the top surface forms a continuous cutting edge.

22. An indexable cutting insert for use in milling cutters comprising:
    a top surface, a bottom surface and M substantially identical side surfaces extending between the bottom surface and the top surface, the top surface having the general shape of an M-sided polygon in a top view of the cutting insert;
    each side surface being located between two corner side surfaces;
    each side surface sloping outwardly from the bottom surface toward the top surface and intersecting with the top surface at an insert cutting edge, the insert cutting edge being located between two corner edges and being substantially parallel to the bottom surface;
    each insert cutting edge comprising a primary cutting edge extending between two auxiliary cutting edges, each auxiliary cutting edge being adjacent a corner edge;
    each primary cutting edge, auxiliary cutting edge and corner edge being capable of cutting such that the entire circumference of the top surface forms a continuous cutting edge;

each side surface comprising at least two component surfaces: a first relief surface adjacent the primary cutting edge and a second relief surface merging with the first relief surface and intersecting with the top surface of the two auxiliary cutting edges; wherein
M is an integral multiple of four and the first relief surface has a width dimension measured perpendicularly to the insert cutting edge, the width dimension having a minimum value proximal to the two auxiliary cutting edges and a maximum value at a central region of the insert cutting edge.

* * * * *